INVENTOR.
LOUIS SCHWAB
BY

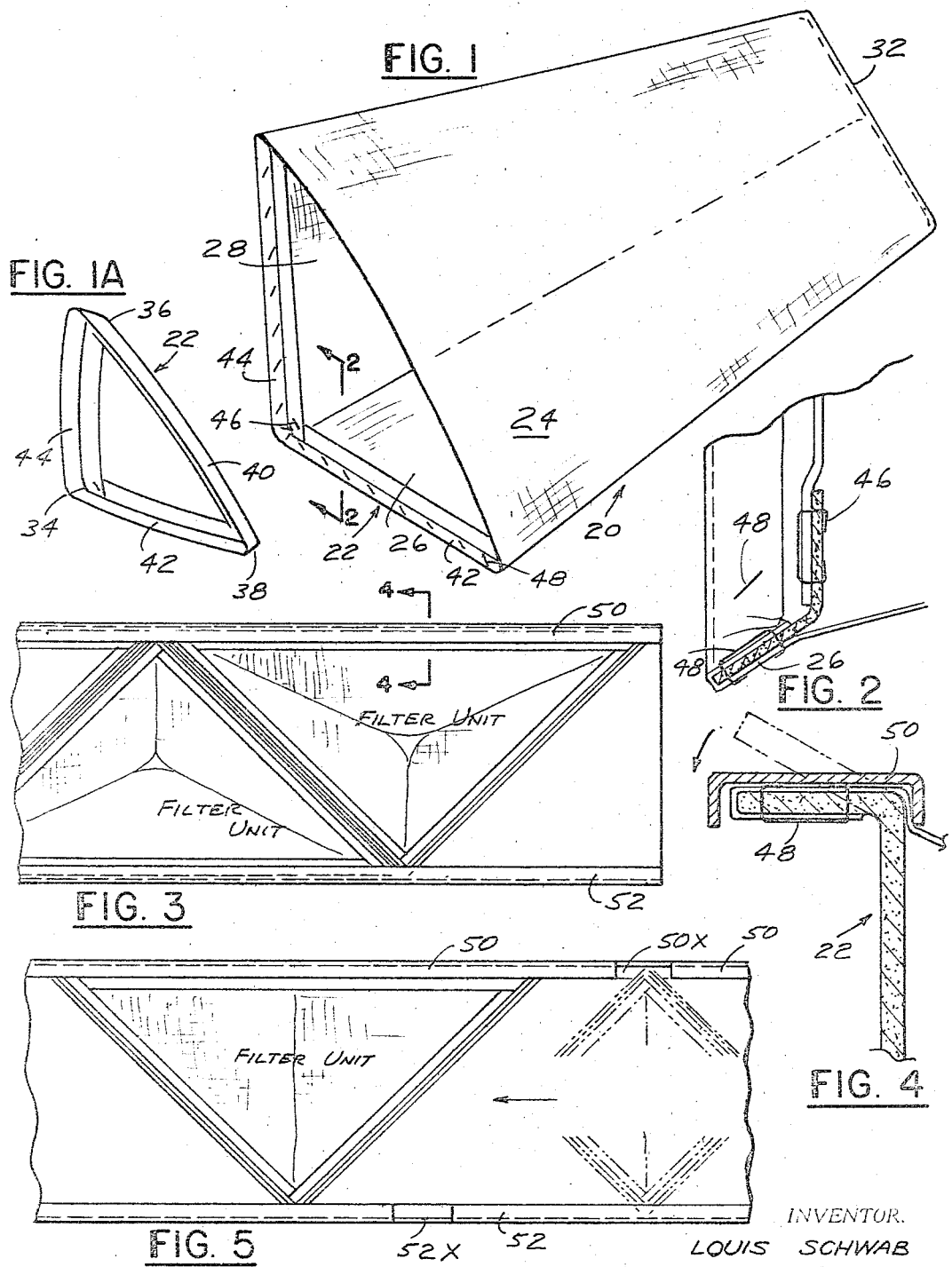

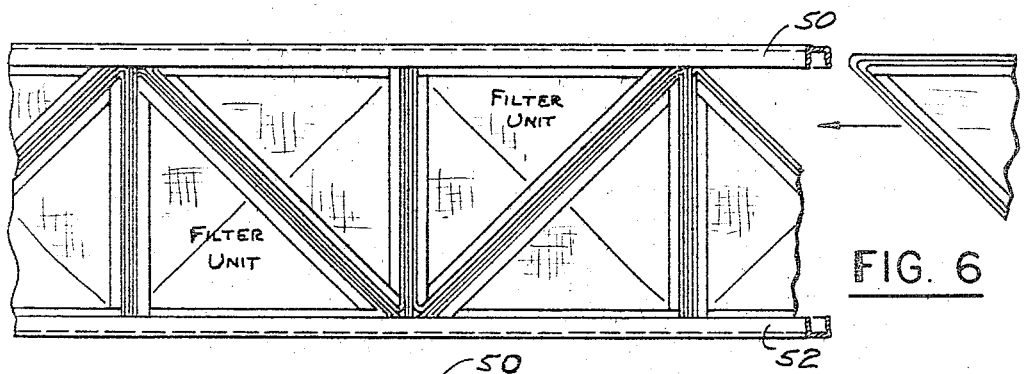
FIG. 6
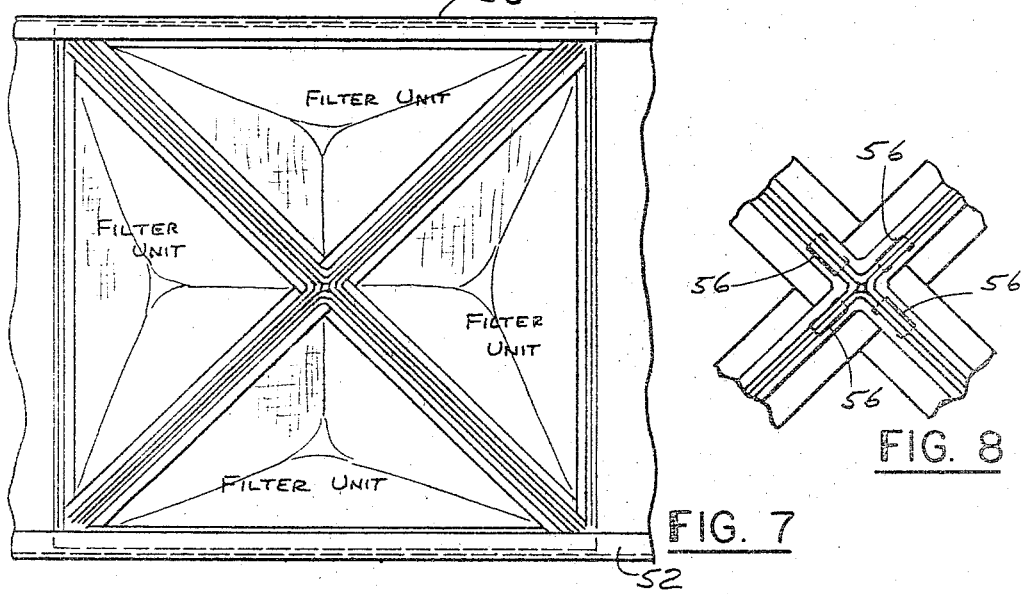
FIG. 7
FIG. 8
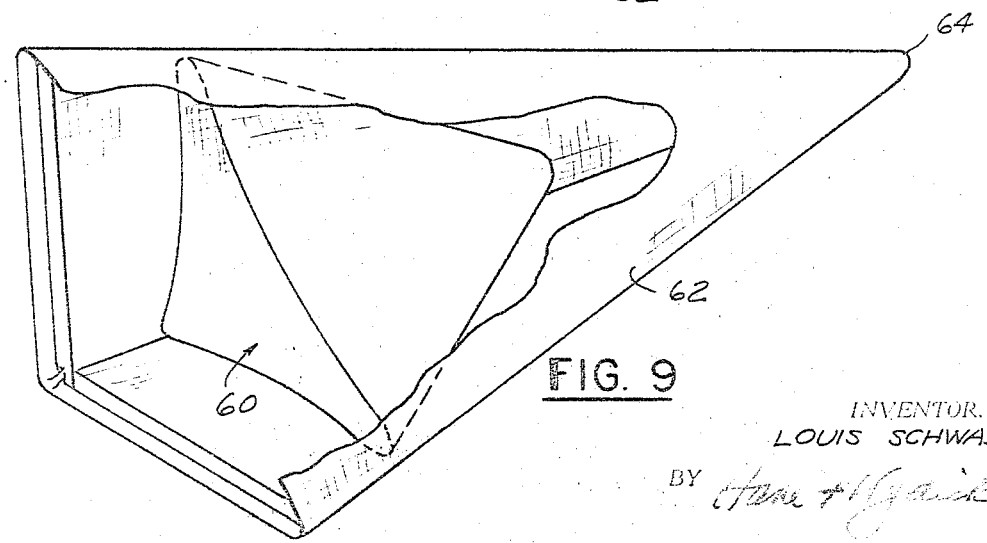
FIG. 9
INVENTOR.
LOUIS SCHWAB
ATTORNEYS March 21, 1967  L. SCHWAB  3,309,848
AIR FILTRATION
Filed June 19, 1964  4 Sheets-Sheet 3

ATTORNEYS

3,309,848
AIR FILTRATION
Louis Schwab, P.O. Box 5146, Orlando, Fla. 32805
Filed June 19, 1964, Ser. No. 376,543
7 Claims. (Cl. 55—341)

This invention relates to the filtration of dust and other particles suspended in gases. More particularly, it is directed to filters generally used in the air ducts of circulating air systems.

A major consideration in the maintenance of circulating air systems for heating, cooling and ventilating is the need for providing replaceable filter units. There is need to replace or clean filter units because the units, when "clogged," impose too great a flow resistance and also because they no longer effectively stop impurities in the air stream.

The filtration units employed in such systems are generally composed of an air-permeable fibrous barrier which impedes the passage of a wide variety of atmospheric dust particles, many of which have a size in the range of less than 5 microns. Depending upon whether the filter tends more towards a pure sieve principle or an impingement-reaction principle, the porosity may variably be larger or smaller than the particles entrained in the air stream. Regardless of the principle involved, it is known that the arresting of the particles by the fiilter increases as the filters become clogged, but there is a correlative sharp increase in flow resistance. Eventually, dust will accumulate to the point where, due to a large pressure differential, the dust particles may possibly be driven through the barrier.

It is a combination of those factors of flow resistance and arrestments of the particles that determines the service life of a filter.

A further consideration is that the velocity through the filter medium is typically in the range of 10 to 50 cubic feet per minute depending, of course, on the particular medium. This naturallly imposes other design limitations.

In order to avoid undue enlargement of a duct which would affect a reduction in velocities, a wide variety of filters have been provided.

In addition to the design of the filter and taking into account the cubage occupied by the filters, another problem of importance has been one of economics, both as to cost of the filter units and the labor entailed in replacing them, as well as the provision of requisite structures for holding the filters in operative position.

This invention is directed to an improvement in the structure of the filter units so as to provide optimum filtration, but characterized by marked simplification in the structure thereof, as well as simplification of the devices for maintaining these improved units in operative position. These improved units are so constructed as to provide for the mounting thereof in relatively simple frames having a minimum of structural members; and at the same time to provide for the self-sealing thereof.

In its fundamental aspects, the filter units of this invention comprise a relatively simple triangular base made of resilient stock which allows for yielding abutment of adjacent edges of contiguous filter units thereby to provide the self-sealing mentioned, as well as the sealing of the filter when it is placed in contact with the holding means. The filter medium is affixed to the aforementioned triangular base by a simple expedient, such as stapling. The filtering medium advantageously is given a tapering configuration in the direction extending from its holding base, thus constituting a hollow structure of substantially elongated tetrahedral configuration. When mounted in a supporting frame, they provide an arrangement of a plurality of the filters as an assemblage of independent filters.

A fuller understanding of this invention will become evident from the following detailed description thereof taken in conjunction with the accompanying drawings wherein:

FIG. 1 is an embodiment of a filter unit made in accordance with this invention.

FIG. 1A is a view in perspective of the triangular base to which is affixed the filtering medium.

FIG. 2 is a section on an enlarged scale of the structure illustrated in FIG. 1 taken on the line 2—2 thereof.

FIG. 3 is a front view showing a pair of filtering units, modifications of the structure illustrated in FIG. 1, as mounted in a holding frame.

FIG. 4 is a section of the structure illustrated in FIG. 3 taken on the line 4—4 thereof.

FIG. 5 is a front view showing a filter unit, of the structure illustrated in FIG. 1, as mounted in a holding frame which provides for front loading thereof.

FIG. 6 is a front view of another arrangement for mounting filter units in accordance with FIG. 1 wherein the filter units are mounted from the side of the frame.

FIG. 7 is a front view showing another arrangement of filter units in accordance with this invention mounted in a frame, the units being disposed so that the apices of their triangular bases meet at a common point.

FIG. 8 is a view on an enlarged scale showing the means for "tying" together the four meeting apices of the filter units illustrated in FIG. 7.

FIG. 9 is a perspective view, partially broken away, showing another form of a filtration unit in accordance with this invention, this unit being provided with a pre-filter disposed to allow a peripheral by-pass of the air.

Figure 10:
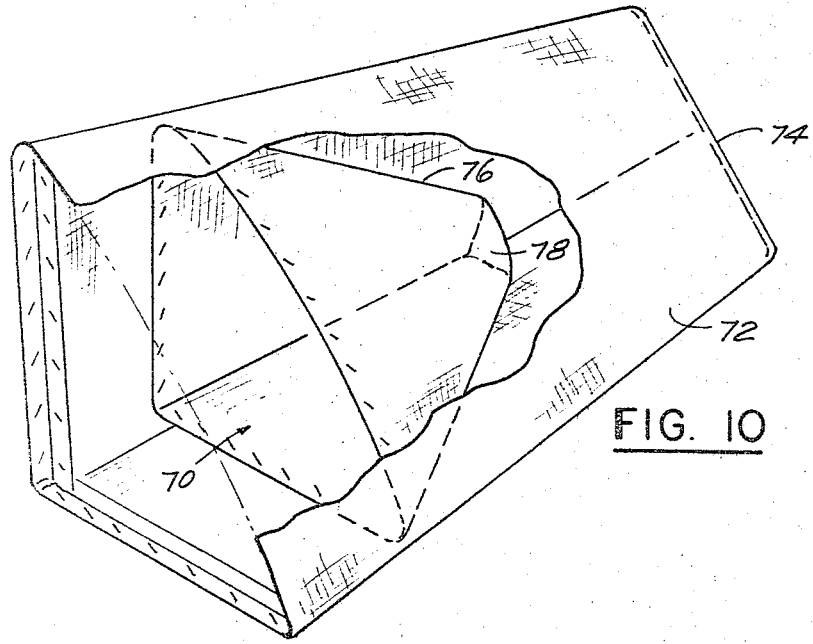
FIG. 10 shows another modification of a filtration unit of this invention provided with a pre-filter.

In FIG. 1, the numeral 20 designates a filtering unit comprising a triangular base 22 and a filtering medium formed of three panels of filtering media 24, 26 and 28, which converge and terminate in the line 32. The base 22 is constructed of fiber board which is cut and bent in the angular positions 34, 36 and 38 to form the legs 40, 42 and 44, each of which is bowed or arced as indicated in FIG. 1A. The overlapping portions in the base member are stapled as indicated at 46. The filtering media is wrapped around the front edge of the triangular base and stapled thereto as at 48.

When a plurality of filter units in accordance with this invention are mounted, as shown in FIGS. 3 and 4, in a frame formed of a plurality of horizontally disposed channels 50, 52, the channels 50, 52 being disposed in facing relationship, the abutting filter units and the holding framework, in consequence of the resiliency of the bases of the filter units, provides for self-sealing of the assemblage.

As shown in FIG. 5, the channels 50 and 52 may be provided with slots $50^x$ and $52^x$ respectively, to allow for front loading. A leg of the triangular base of a filter unit is set within a channel and the apex opposite that leg is introduced at the slot $50^x$. In this way the filter unit can be slid to a remote position; another filter unit inserted in a similar fashion; and the operation repeated until the line is filled.

Where space is available, the filter units can be inserted between a pair of supporting channels 50 and 52 from the side, as shown in FIG. 6.

In FIG. 7 there is shown, mounted between a pair of channels 50 and 52, and in self-sealing arrangement, four filter units so grouped that apices of their triangular bases meet at a common locus. To provide for sturdiness of this grouping, the adjacent bases of the abutting filter units may conveniently be tied together by staples 56 as shown in FIG. 8.

Figure 11:
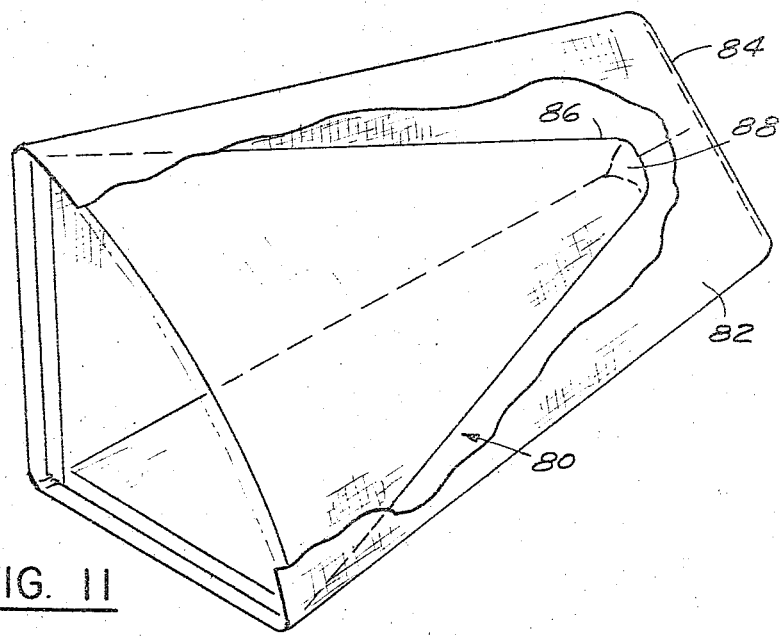
FIG. 11 shows another modification of a filtration unit in accordance with this invention, constituting a filter unit as illustrated in FIG. 1 and provided also with a pre-filter held by the triangular base of the filter.

The filtration units may be provided with prefilters, illustrative forms of which are shown in FIGS. 9, 10 and 11.

The pre-filter shown in FIG. 9 is akin, in respect of positioning within the main or outer filter, to the structure described in my pending application Ser. No. 248,139, filed Dec. 28, 1962, now Patent No. 3,204,391. The pre-filter 60 in FIG. 9 has a base which is located inwardly of the upstream end of the outer filter 62; and terminates at a position spaced inwardly of the downstream end 64 of the outer filter 62. The base of the pre-filter is configured and disposed so as to provide a peripheral by-pass for the air between the base of the pre-filter and the inner surface of the main filter, as described in my aforesaid pending application.

In FIG. 10 the pre-filter 70 has a base portion which is located inwardly of the upstream end of the outer or main filter 72, this outer filter being akin to the filter unit illustrated in FIG. 1; and terminates at a position spaced inwardly of the downstream end 74 of the outer filter 72. The structure of FIG. 10 differs from the structure of FIG. 9 in that all of the base of the pre-filter is affixed to the inner wall of the main filter. Additionally, the downstream end 76 of this pre-filter is provided with a relatively small pressure relief hole or orifice 78, which makes up for the absence of the peripheral by-pass present in FIG. 9.

In FIG. 11 the pre-filter 80 has a base which is co-terminus with the upstream end of the main filter 82, this outer filter being akin to the filter unit illustrated in FIG. 1. The base of 80 is affixed to the triangular base to which the medium of the main filter is attached. This may be done by wrapping the base of the pre-filter around said triangular base; and stapling the media of both the outer filter and the pre-filter to said triangular base. The pre-filter 80 terminates at a position spaced inwardly of the downstream end 84 of the outer filter 82. Additionally, the downstream end 86 of this pre-filter is provided with a relatively small pressure relief hole or orifice 88 akin to the pressure relief orifice 78 of FIG. 10.

Figure 12:
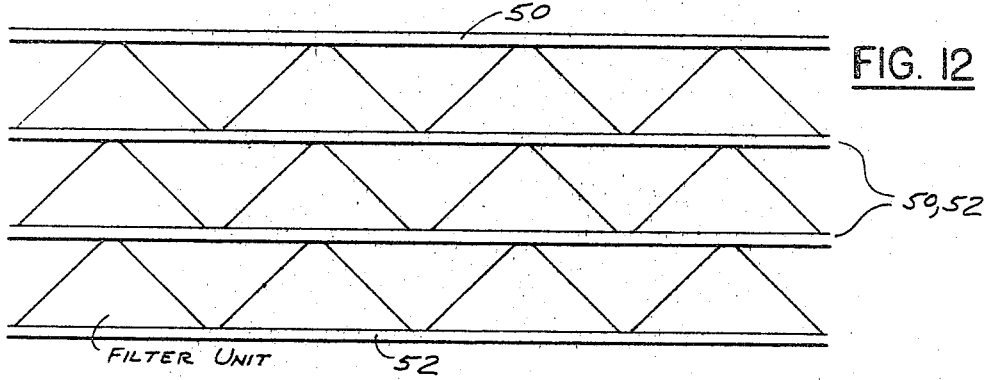
FIG. 12 is a schematic illustration of the front elevation of a frame in which is mounted a plurality of filter units as shown in FIG. 5.

In FIG. 12 is shown an assemblage of filtration units mounted in a simple frame constituted of filter unit-supporting channels disposed within a plenum, thus providing assemblages of a plurality of filter units arranged as illustrated in FIGS. 3, 4, 5 and 6.

Figure 13:
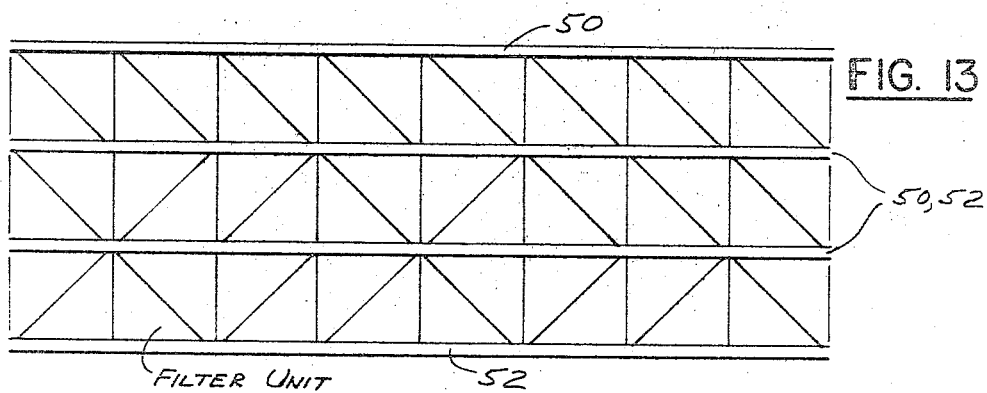
FIG. 13 is a schematic illustration of the front elevation of a frame in which is mounted a plurality of filter units mounted as shown in FIG. 6

In FIG. 13 is shown an assemblage of filtration units mounted in a simple framework constituted of filter unit-supporting channels disposed within a plenum, thus providing assemblages of a plurality of filter units arranged as illustrated in FIG. 6.

Figure 14:
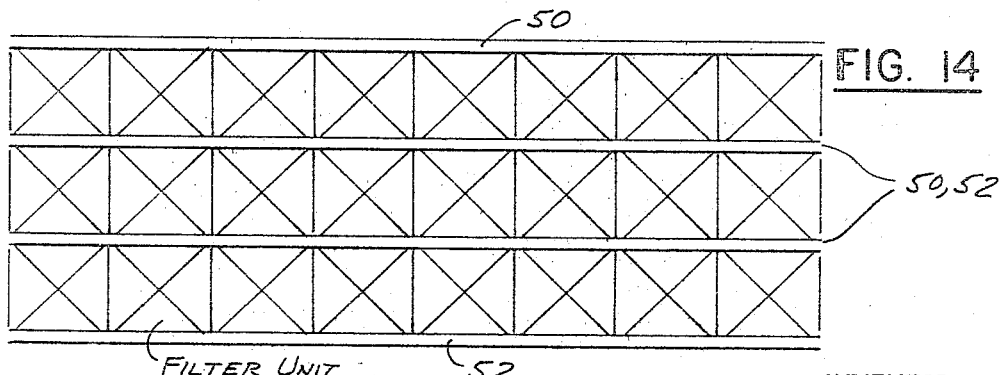
FIG. 14 is a schematic illustration of the front elevation of a frame in which is mounted a plurality of filter units mounted as shown in FIGS. 7 and 8.

In FIG. 14 is shown an assemblage of filtration units mounted in a simple frame constituted of filter unit-supporting channels disposed within a plenum, thus providing assemblages of a plurality of filter units arranged as illustrated in FIGS. 7 and 8.

From the foregoing description of this invention it will be apparent that marked advantages and economies are achieved, as for example, low initial cost of a simple supporting framework, low cost of filter units, small amount of labor of installation, replacement and maintenance. This achievement occurs in consequence of the tetrahedral configuration of the filter units, which are formed by affixing of the hollow tetrahedrally configured filtering media (of the kind well known to this art, including that of the prefilters when used), to the outwardly bowed resilient triangular bases, which bases are substantially right triangles. In consequence of such being and the resiliency of the bases, the filter units can be readily installed in, and removed from, an exceedingly simple framework set within the plenum. Such a framework consists of pairs of channels disposed in facing relationship as has been described.

Moreover, where the depth of the plenum is short or limited, the inadequacy of plenum space is especially overcome by installing filtration units of relatively short depths, i.e., the length from the upstream end to the downstream end, arranged particularly in the assemblages illustrated in FIGS. 7 and 14.

The self-sealing is readily attained, as between the filter unit and the channeled framework in which it is mounted, as shown in FIG. 4. Likewise, the self-sealing as between adjacent filter units, is achieved by the pressure of the legs of the triangular bases which are in abutment with each other, as illustrated in the various views hereinabove described.

It will be understood that the foregoing description of the invention is merely illustrative of the principles thereof. Accordingly, the appended claims are to be construed as defining the invention within the full spirit and scope thereof.

I claim:

1. A filter unit for use in separating entrained particles carried by an air stream comprising:
   (1) a hollow outer member formed of air-permeable filtering material having a triangular upstream open end and a downstream closed end, the member consisting of three wall portions which taper from the upstream end to the downstream closed end, the upstream open end comprising a triangular base having resilient legs which are outwardly and coplanarly bowed, the wall portions being affixed to the base; and
   (2) an inner hollow tapering pre-filter member, formed of filtering material disposed within and attached to member 1 at a plurality of spaced apart points, the downstream end of the pre-filter terminating inwardly of the downstream end of member (1), the pre-filter being spaced from the inner walls of member (1) except for the area where the pre-filter is attached to member (1), such spacing allowing a peripheral portion of the air stream to bypass the pre-filter.

2. A filter unit for use in separating entrained particles carried by an air stream comprising:
   (1) a hollow outer member formed of air-permeable filtering material having a triangular upstream open end and a downstream closed end, the member consisting of three wall portions which taper from the upstream end to the downstream closed end, the upstream open end comprising a triangular base having resilient legs which are outwardly and coplanarly bowed, the wall portions being affixed to the base; and
   (2) an inner hollow tapering pre-filter member formed of filtering material disposed within member (1), and attached thereto inwardly of the base of member (1), the downstream end of the pre-filter being disposed inwardly of the downstream end of member (1); and
   (3) means securing peripheral upstream edges of the pre-filter to member (1) at a plurality of spaced apart points, the remaining portions of the peripheral edges being spaced from the inner surface of member 1, such spacing allowing a peripheral portion of the air stream to, by pass the pre-filter.

3. An assemblage of filter units disposed in sealed relationship comprising: a pair of channels arranged in facing relationship, between which channels are set a plurality of abutting filter units in accordance with claim 2, the bases of which are disposed in sealed relationship.

4. A filter unit for use in separating entrained particles carried by an air stream comprising:

(1) a hollow outer member formed of air-permeable filtering material having a triangular upstream open end and a downstream closed end, the member consisting of three wall portions which taper from the upstream end to the downstream closed end, the upstream open end comprising a triangular base having resilient legs which are outwardly and coplanarly bowed, the wall portions being affixed to the base; and (2) an inner hollow tapering pre-filter member formed of filtering material disposed within and attached to member (1), the downstream end of the pre-filter being disposed inwardly of the downstream end of member (1), the pre-filter being spaced apart from the inner walls of member 1 except for the area where the pre-filter is attached to member (1); and the downstream end of member (2) being open, thereby allowing a portion of the airstream to pass therethrough.

5. An assemblage of filter units disposed in sealed relationship comprising: a pair of channels arranged in facing relationship, between which channels are set a plurality of abutting filter units in accordance with claim 4, the bases of which are disposed in sealed relationship.

6. A structure in accordance with claim 4 wherein the upstream ends of members (1) and (2) are coterminous.

7. An assemblage of filter units disposed in sealed relationship comprising: a pair of channels arranged in facing relationship, between which channels are set a plurality of abutting filter units in accordance with claim 6, the bases of which are disposed in sealed relationship.

References Cited by the Examiner

UNITED STATES PATENTS

| | | | |
|---|---|---|---|
| 1,813,896 | 7/1931 | Paine | 55—341 X |
| 2,068,858 | 1/1937 | Jones | 55—482 |
| 2,853,154 | 9/1958 | Rivers | 55—341 |
| 2,964,127 | 12/1960 | Korn | 55—487 X |
| 3,151,962 | 10/1964 | O'Dell | 55—382 X |

HARRY B. THORNTON, *Primary Examiner.*

ROBERT F. BURNETT, *Examiner.*

D. TALBERT, *Assistant Examiner.*